UNITED STATES PATENT OFFICE.

WILLIAM J. DEMING, OF MURPHYSBOROUGH, ILLINOIS.

INSECT-EXTERMINATING COMPOUND.

SPECIFICATION forming part of Letters Patent No. 593,990, dated November 23, 1897.

Application filed April 2, 1897. Serial No. 630,457. (No specimens.)

*To all whom it may concern:*

Be it known that I, WILLIAM J. DEMING, a citizen of the United States, residing at Murphysborough, in the county of Jackson, State of Illinois, have invented certain new and useful Improvements in Insect-Exterminating Compounds, of which the following is a specification.

This invention has for its object the provision of a compound for the extermination of mosquitos, flies, and other insects.

I make a compound in a plastic mass adapted to be molded or shaped into any desired form and which when ignited will slowly give off a smoke and odor that will drive the mosquitos and other insects from a room, and this without being obnoxious or injurious to the persons in the room.

The compound consists of the following ingredients in substantially the proportions specified: pyrethrum, nine ounces; alcohol, eight ounces; oil of pennyroyal, one ounce; gum-camphor, one ounce; carbolic acid, one ounce. These ingredients are thoroughly mixed and then molded or otherwise treated to form the same in sticks of any desired length and diameter or any required shape.

In use a match applied to the material ignites it and it burns slowly, giving off a smoke and odor that will drive from the room the mosquitos, flies, and other insects.

While I have found from experience that the above proportions are very efficient, the same may be varied within certain limits without departing from the spirit of the invention or sacrificing any efficient properties of the compound.

The compound composed of the beforementioned ingredients may also be prepared in a pulverized or powdered form instead of in a plastic form and applied by means of a bellows or blower, so as to force the powder into crevices or other places desired. The compound when in this form may be very conveniently applied for the extermination of bedbugs and other insects.

Having thus described my invention, what I claim as new, and desire to secure by Letters Patent, is—

A composition of matter for the purpose described, composed of pyrethrum, gum-camphor, alcohol, carbolic acid, and oil of pennyroyal in substantially the proportions specified.

In testimony whereof I affix my signature in presence of two witnesses.

WILLIAM J. DEMING.

Witnesses:
R. W. WATSON,
R. P. MARTIN.